US008357475B2

(12) United States Patent
Niu et al.

(10) Patent No.: US 8,357,475 B2
(45) Date of Patent: Jan. 22, 2013

(54) NANOWIRE-BASED MEMBRANE ELECTRODE ASSEMBLIES FOR FUEL CELLS

(75) Inventors: Chunming Niu, Palo Alto, CA (US); Calvin Y. H. Chow, Portola Valley, CA (US); Stephen A. Empedocles, Los Altos, CA (US); J. Wallace Parce, Palo Alto, CA (US)

(73) Assignee: Nanosys, Inc., Palo Alto, CA (US)

( * ) Notice: Subject to any disclaimer, the term of this patent is extended or adjusted under 35 U.S.C. 154(b) by 0 days.

(21) Appl. No.: 13/149,527

(22) Filed: May 31, 2011

(65) Prior Publication Data
US 2011/0229795 A1    Sep. 22, 2011

Related U.S. Application Data

(63) Continuation of application No. 12/234,104, filed on Sep. 19, 2008, now Pat. No. 7,977,007, which is a continuation of application No. 11/642,241, filed on Dec. 20, 2006, now Pat. No. 7,977,013, which is a continuation of application No. 11/295,133, filed on Dec. 6, 2005, now Pat. No. 7,179,561.

(60) Provisional application No. 60/738,100, filed on Nov. 21, 2005, provisional application No. 60/634,472, filed on Dec. 9, 2004.

(51) Int. Cl.
*H01M 4/86* (2006.01)
(52) U.S. Cl. ........................................ 429/530; 429/532
(58) Field of Classification Search .................. 429/492, 429/532, 530
See application file for complete search history.

(56) References Cited

U.S. PATENT DOCUMENTS

| 4,849,311 A | 7/1989 | Itoh et al. |
| 5,338,430 A | 8/1994 | Parsonage et al. |
| 5,399,184 A | 3/1995 | Harada |
| 5,505,928 A | 4/1996 | Alivisatos et al. |
| 5,635,041 A | 6/1997 | Bahar et al. |
| 5,677,082 A | 10/1997 | Greinke et al. |
| 5,690,807 A | 11/1997 | Clark et al. |
| 5,751,018 A | 5/1998 | Alivisatos et al. |
| 5,879,827 A | 3/1999 | Debe et al. |

(Continued)

FOREIGN PATENT DOCUMENTS

EP     1553052     7/2005

(Continued)

OTHER PUBLICATIONS

Choi, W.C. et al., "Bimetallic Pt-Ru nanowire network for anode material in a direct-methanol fuel cell" J. Power Sources (2003) 124(2):420-425.

(Continued)

*Primary Examiner* — Stephen J. Kalafut
(74) *Attorney, Agent, or Firm* — Andrew L. Filler

(57) ABSTRACT

The present invention discloses nanowires for use in a fuel cell comprising a metal catalyst deposited on a surface of the nanowires. A membrane electrode assembly for a fuel cell is disclosed which generally comprises a proton exchange membrane, an anode electrode, and a cathode electrode, wherein at least one or more of the anode electrode and cathode electrode comprise an interconnected network of the catalyst supported nanowires. Methods are also disclosed for preparing a membrane electrode assembly and fuel cell based upon an interconnected network of nanowires.

22 Claims, 7 Drawing Sheets

U.S. PATENT DOCUMENTS

| | | | |
|---|---|---|---|
| 5,879,828 A | 3/1999 | Debe et al. |
| 5,897,945 A | 4/1999 | Lieber et al. |
| 5,910,378 A | 6/1999 | Debe et al. |
| 5,916,642 A | 6/1999 | Chang |
| 5,990,479 A | 11/1999 | Weiss et al. |
| 5,997,832 A | 12/1999 | Lieber et al. |
| 6,036,774 A | 3/2000 | Lieber et al. |
| 6,048,616 A | 4/2000 | Gallagher et al. |
| 6,136,156 A | 10/2000 | El-Shall et al. |
| 6,225,198 B1 | 5/2001 | Alivisatos et al. |
| 6,248,674 B1 | 6/2001 | Kamins et al. |
| 6,303,266 B1 | 10/2001 | Okino et al. |
| 6,306,736 B1 | 10/2001 | Alivisatos et al. |
| 6,361,861 B2 | 3/2002 | Gao et al. |
| 6,413,489 B1 | 7/2002 | Ying et al. |
| 6,479,030 B1 | 11/2002 | Firsich |
| 6,504,292 B1 | 1/2003 | Choi et al. |
| 6,582,673 B1 | 6/2003 | Chow et al. |
| 6,589,682 B1 | 7/2003 | Fleckner et al. |
| 6,610,355 B2 | 8/2003 | Yadav et al. |
| 6,648,712 B2 | 11/2003 | Choi et al. |
| 6,741,019 B1 | 5/2004 | Filas et al. |
| 6,749,827 B2 | 6/2004 | Smalley et al. |
| 6,749,892 B2 | 6/2004 | Chang |
| 6,755,956 B2 | 6/2004 | Lee et al. |
| 6,756,026 B2 | 6/2004 | Colbert et al. |
| 6,781,166 B2 | 8/2004 | Lieber et al. |
| 6,809,229 B2 | 10/2004 | Moy et al. |
| 6,875,537 B2 | 4/2005 | Tani et al. |
| 6,911,767 B2 | 6/2005 | Takai |
| 6,926,985 B2 | 8/2005 | Wariishi et al. |
| 6,933,033 B1 | 8/2005 | Forsyth et al. |
| 6,949,206 B2 | 9/2005 | Whiteford et al. |
| 6,962,823 B2 | 11/2005 | Empedocles et al. |
| 6,976,897 B2 | 12/2005 | Choi et al. |
| 7,009,331 B2 | 3/2006 | Sheu et al. |
| 7,105,428 B2 | 9/2006 | Pan et al. |
| 7,115,971 B2 | 10/2006 | Stumbo et al. |
| 7,129,554 B2 | 10/2006 | Lieber et al. |
| 7,132,188 B2 | 11/2006 | Masel et al. |
| 7,135,728 B2 | 11/2006 | Duan et al. |
| 7,179,561 B2 | 2/2007 | Niu et al. |
| 7,189,472 B2 | 3/2007 | Suenaga et al. |
| 7,351,444 B2 * | 4/2008 | Wang et al. ............... 429/532 X |
| 7,553,371 B2 | 6/2009 | Dubrow et al. |
| 7,842,432 B2 | 11/2010 | Niu et al. |
| 7,939,218 B2 | 5/2011 | Niu |
| 2002/0130311 A1 | 9/2002 | Lieber et al. |
| 2002/0142202 A1 | 10/2002 | Li et al. |
| 2002/0172820 A1 | 11/2002 | Majumdar et al. |
| 2002/0179434 A1 | 12/2002 | Dai et al. |
| 2003/0008772 A1 | 1/2003 | Ma et al. |
| 2003/0044608 A1 | 3/2003 | Yoshizawa et al. |
| 2003/0073573 A1 | 4/2003 | Baker et al. |
| 2003/0089899 A1 | 5/2003 | Lieber et al. |
| 2003/0091891 A1 | 5/2003 | Yoshida et al. |
| 2004/0018416 A1 | 1/2004 | Choi et al. |
| 2004/0026684 A1 | 2/2004 | Empedocles |
| 2004/0118698 A1 | 6/2004 | Lu et al. |
| 2004/0167014 A1 | 8/2004 | Yan et al. |
| 2004/0197638 A1 | 10/2004 | McElrath et al. |
| 2004/0202599 A1 | 10/2004 | Xu et al. |
| 2004/0224217 A1 | 11/2004 | Toops |
| 2004/0234841 A1 | 11/2004 | Yoshitake et al. |
| 2005/0053826 A1 | 3/2005 | Wang et al. |
| 2005/0064185 A1 | 3/2005 | Buretea et al. |
| 2005/0066883 A1 | 3/2005 | Dubrow et al. |
| 2005/0112451 A1 | 5/2005 | Lee et al. |
| 2005/0176264 A1 | 8/2005 | Lai et al. |
| 2005/0181195 A1 | 8/2005 | Dubrow |
| 2005/0181209 A1 | 8/2005 | Karandikar |
| 2005/0221072 A1 | 10/2005 | Dubrow et al. |
| 2005/0238810 A1 | 10/2005 | Scaringe et al. |
| 2005/0287418 A1 | 12/2005 | Noh et al. |
| 2006/0003212 A1 | 1/2006 | Kim et al. |
| 2006/0008942 A1 | 1/2006 | Romano et al. |
| 2006/0009003 A1 | 1/2006 | Romano et al. |
| 2006/0066217 A1 | 3/2006 | Son |
| 2006/0115711 A1 | 6/2006 | Kim et al. |
| 2006/0116284 A1 | 6/2006 | Pak et al. |
| 2006/0159916 A1 | 7/2006 | Dubrow et al. |
| 2007/0026293 A1 | 2/2007 | Kim et al. |
| 2007/0190880 A1 | 8/2007 | Dubrow et al. |
| 2007/0212538 A1 | 9/2007 | Niu |
| 2010/0297502 A1 | 11/2010 | Zhu et al. |

FOREIGN PATENT DOCUMENTS

| | | |
|---|---|---|
| JP | 59-127372 | 7/1984 |
| JP | 64-014873 | 1/1989 |
| JP | 1994203840 | 7/1994 |
| JP | 1996017440 | 1/1996 |
| JP | 2000353528 | 12/2000 |
| JP | 2003-282097 A | 10/2003 |
| JP | 2005-193182 A | 7/2005 |
| JP | 2006131499 | 5/2006 |
| WO | 02080280 | 10/2002 |
| WO | 2004099068 | 11/2004 |
| WO | 2005069955 | 8/2005 |
| WO | 2005075048 | 8/2005 |
| WO | 2007001343 | 1/2007 |
| WO | 2010096035 | 8/2010 |

OTHER PUBLICATIONS

Dabbousi et al., "(CdSe)ZnS core-shell quantum dots: Synthesis and characterization of a size series of highly luminescent nanocrystallites" J. Phys. Chem. B (1997) 101:9463-9475.

Greene, L. et al., "Low-temperature wafer scale production of ZnO nanowire arrays" Angew. Chem. Int. Ed. (2003) 42:3031-3034.

Manna et al., "Epitaxial growth and photochemical annealing of graded CdS/ZnS shells on colloidal CdSe nanorods" J. Am. Chem. Soc. (2002) 124:7136-7145.

Morales, A.M. et al., "A laser ablation method for the synthesis of crystalline semiconductor nanowires" Science (1998) 279:208-211.

Peng, X. et al. "Epitaxial growth of highly luminescentCdSe/CdS core/shell nanocrystals with photostability and electronic accessibility" J. Am. Chem. Soc. (1997) 119:7019-7029.

Supplementary Search Report for related European Patent Application 05853082.5 dated Jun. 19, 2009.

Bjork, M.T. et al. "One-dimensional Steeplechase for Electron Realized" Nano Lett (2002) 2:86-90.

Cao, Y.W. et al. "Growth and Properties of Semiconductor Core/Shell Nanocrystals with InAs Cores" J. Am. Chem. Soc. (2000) 122:9692-9702.

Cui, Y. et al. "Diameter-controlled synthesis of single-crystal silicon nanowires" Appl. Phys. Lett (2001) 78 (15):2214-2216.

Cui, Y. et al. "Doping and electrical transport in silicon wires" J. Phys. Chem. B. (2000) 104:5213-5216.

Duan, X. et al. "General synthesis of compound semiconductor nanowires" Adv. Mater. (2000) 12:298-302.

Duan, X. et al. "High-performance thin-film transistors using semiconductor nanowires and nanoribbons" Nature (2003) 425:274-278.

Gudiksen, M.S. et al. "Diameter-selective synthesis of semiconductor nanowires" J. Am. Chem. Soc. (2000) 122:8801-8802.

Gudiksen, M.S. et al. "Growth of nanowire superlattice structures of nanoscale photonics and electronics" Nature (2002) 415:617-620.

Gudiksen, M.S. et al. "Synthetic control of the diameter and length of single crystal semiconductor nanowires" J. Phys. Chem. (2001) 105:4062-4064.

Jun, Y-W, et al. "Controlled synthesis of multi-armed CdS nanorod architectures using monosurfactant system" J. Am. Chem. Soc. (2001) 123:5150-5151.

Liu, C. et al. "Sol-Gel Synthesis of Free-Standing Ferroelectric Lead Zirconate Titanate Nanoparticles" J. Am. Chem. Soc. (2001) 123:4344-4345.

Manna, L. et al. "Synthesis of soluble and processable rod-, arrow-, teardrop-, and tetrapod-shaped CdSe nanocrystals" J. Am. Chem. Soc. (2000) 122:12700-12706.

Peng, X. et al. "Shape control of CdSe nanocrystals" Nature (2000) 404:59-61.

Puntes, V.F. et al. "Colloidal nanocrystal shape and size control: The case of cobalt" Science (2001) 291:2115-2117.

Urban, J.J. et al. "Synthesis of single-crystalline perovskite nanowires composed of brium titanate and strontium titanate" J. Am. Chem. Soc. (2002) 124:1186-1187.

Wu, Y. et al. "Block-by-block growth of single-crystalline Si/SiGe superlattice nanowires" Nano Lett (2002) 2:83-86.

Yang, W. et al. "Fabrication in-situ SiC nanowires/SiC matrix composite by chemical vapour infiltration process" Mat. Lett (2004) 58(25):3145-3148.

Yun, W.S. et al. "Ferroelectric properties of individual barium titanate nanowires investigated by scanned probe microscopy" Nano Lett (2002) 2(5):447-450.

* cited by examiner

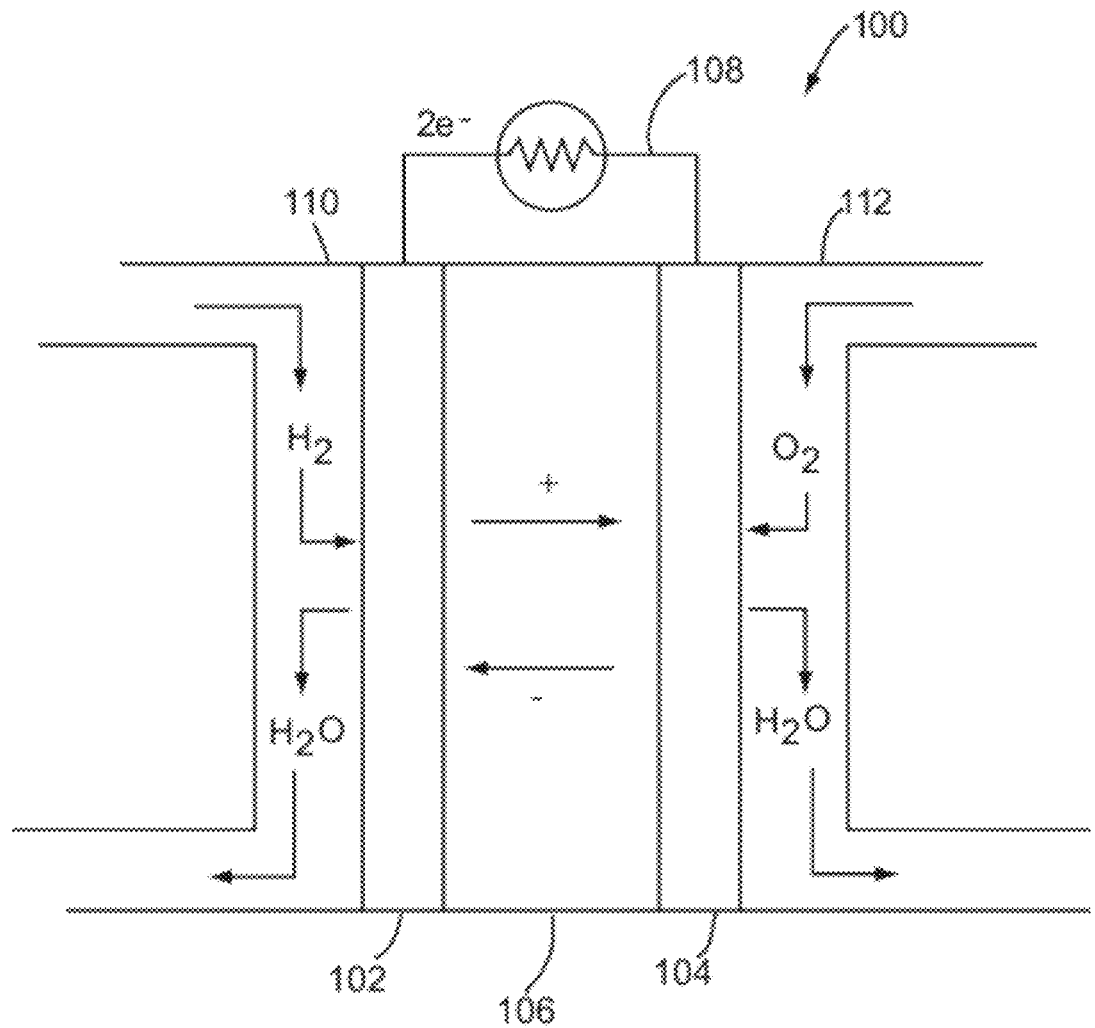
Fig. 1 - PRIOR ART

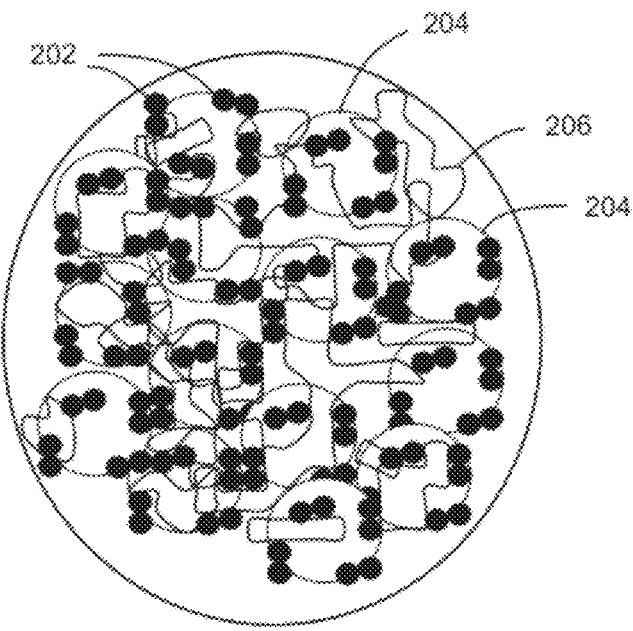
Fig. 2A - PRIOR ART
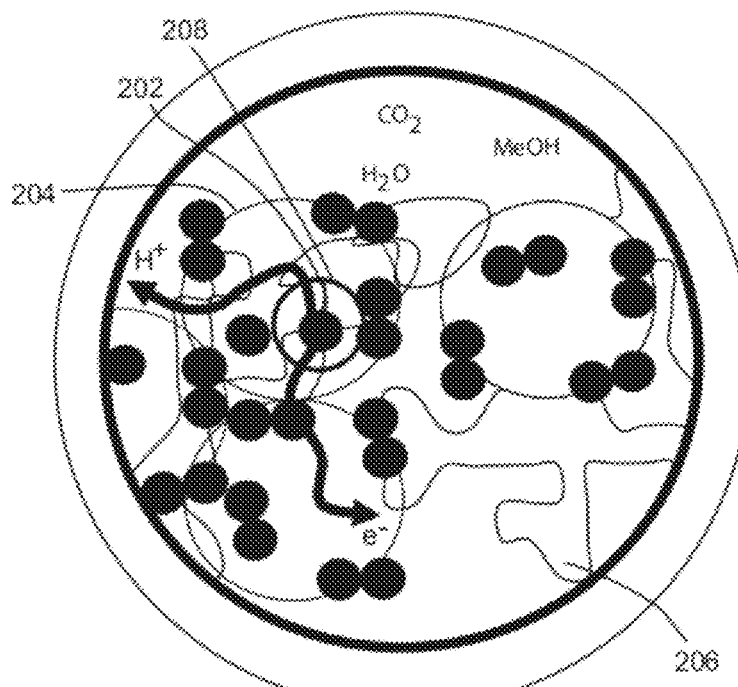
Fig. 2B - PRIOR ART

_US 8,357,475 B2_

NANOWIRE-BASED MEMBRANE ELECTRODE ASSEMBLIES FOR FUEL CELLS

CROSS-REFERENCE TO RELATED APPLICATIONS

This non-provisional application is a continuation of U.S. patent application Ser. No. 12/234,104, filed Sep. 19, 2008, now U.S. Pat. No. 7,977,007, which is a continuation of U.S. patent application Ser. No. 11/642,241, filed Dec. 20, 2006, now U.S. Pat. No. 7,977,013, which is a continuation of U.S. patent application Ser. No. 11/295,133, filed Dec. 6, 2005, now U.S. Pat. No. 7,179,561, which claims priority to U.S. provisional Patent Application No. 60/738,100, filed Nov. 21, 2005, and U.S. provisional Patent Application No. 60/634,472, filed Dec. 9, 2004, the entire contents of each of which are incorporated by reference herein.

STATEMENT REGARDING FEDERALLY SPONSORED RESEARCH

Not applicable.

FIELD OF THE INVENTION

This invention relates to fuel cells generally, and, more particularly, to nanowire-based electrodes and membrane electrode assemblies for such fuel cells.

BACKGROUND OF THE INVENTION

Fuel cells are devices that convert the chemical energy of fuels, such as hydrogen and methanol, directly into electrical energy. The basic physical structure or building block of a fuel cell consists of an electrolyte layer in contact with a porous anode and cathode on either side. A schematic representation of a fuel cell with the reactant/product gases and the ion conduction flow directions through the cell is shown in FIG. 1. In a typical fuel cell as shown in FIG. 1, a fuel (e.g., methanol or hydrogen) is fed to an anode catalyst that converts the fuel molecules into protons (and carbon dioxide for methanol fuel cells), which pass through the proton exchange membrane to the cathode side of the cell. At the cathode catalyst, the protons (e.g., hydrogen atoms without an electron) react with the oxygen ions to form water. By connecting a conductive wire from the anode to the cathode side, the electrons stripped from fuel, hydrogen or methanol on the anode side can travel to the cathode side and combine with oxygen to form oxygen ions, thus producing electricity. Fuel cells operating by electrochemical oxidation of hydrogen or methanol fuels at the anode and reduction of oxygen at the cathode are attractive power sources because of their high conversion efficiencies, low pollution, lightweight, and high energy density.

For example, in direct methanol fuel cells (DMFCs), the liquid methanol ($CH_3OH$) is oxidized in the presence of water at the anode generating $CO_2$, hydrogen ions and the electrons that travel through the external circuit as the electric output of the fuel cell. The hydrogen ions travel through the electrolyte and react with oxygen from the air and the electrons from the external circuit to form water at the anode completing the circuit.

Anode Reaction: $CH_3OH + H_2O \Rightarrow CO_2 + 6H^+ + 6e^-$
Cathode Reaction: $\frac{3}{2} O_2 + 6H^+ + 6e^- \Rightarrow 3H_2O$
Overall Cell Reaction: $CH_3OH + \frac{3}{2} O_2 \Rightarrow CO_2 + 2H_2O$ Initially developed in the early 1990s, DMFCs were not embraced because of their low efficiency and power density, as well as other problems. Improvements in catalysts and other recent developments have increased power density 20-fold and the efficiency may eventually reach 40%. These cells have been tested in a temperature range from about 50° C.-120° C. This low operating temperature and no requirement for a fuel reformer make the DMFC an excellent candidate for very small to mid-sized applications, such as cellular phones, laptops, cameras and other consumer products, up to automobile power plants. One of the drawbacks of the DMFC is that the low-temperature oxidation of methanol to hydrogen ions and carbon dioxide requires a more active catalyst, which typically means a larger quantity of expensive platinum (and/or ruthenium) catalyst is required.

A DMFC typically requires the use of ruthenium (Ru) as a catalyst component because of its high carbon monoxide (CO) tolerance and reactivity. Ru disassociates water to create an oxygenated species that facilitates the oxygenation of CO, which is produced from the methanol, to $CO_2$. Some existing DFMCs use nanometer-sized bimetallic Pt:Ru particles as the electro-oxidation catalyst because of the high surface area to volume ratio of the particles. The Pt/Ru nanoparticles are typically provided on a carbon support (e.g., carbon black, fullerene soot, or desulfurized carbon black) to yield a packed particle composite catalyst structure. Most commonly used techniques for creating the Pt:Ru carbon packed particle composite are the impregnation of a carbon support in a solution containing platinum and ruthenium chlorides followed by thermal reduction A multi-phase interface or contact is established among the fuel cell reactants, electrolyte, active Pt:Ru nanoparticles, and carbon support in the region of the porous electrode. The nature of this interface plays a critical role in the electrochemical performance of the fuel cell. It is known that only a portion of catalyst particle sites in packed particle composites are utilized because other sites are either not accessible to the reactants, or not connected to the carbon support network (electron path) and/or electrolyte (proton path). In fact, current packed particle composites only utilize about 20 to 30% of the catalyst particles. Thus, most DMFCs which utilize packed particle composite structures are highly inefficient.

In addition, connectivity to the anode and/or cathode is currently limited in current packed particle composite structures due to poor contacts between particles and/or tortuous diffusion paths for fuel cell reactants between densely packed particles. Increasing the density of the electrolyte or support matrix increases connectivity, but also decreases methanol diffusion to the catalytic site. Thus, a delicate balance must be maintained among the electrode, electrolyte, and gaseous phases in the porous electrode structure in order to maximize the efficiency of fuel cell operation at a reasonable cost. Much of the recent effort in the development of fuel cell technology has been devoted to reducing the thickness of cell components while refining and improving the electrode structure and the electrolyte phase, with the aim of obtaining a higher and more stable electrochemical performance while lowering cost. In order to develop commercially viable DFMCs, the electrocatalytic activity of the catalyst must be improved.

The present invention meets these and other needs as well. The present invention generally provides a novel nanowire composite membrane electrode catalyst support assembly that provides a highly porous material with a high surface area, a high structural stability and a continuum structure. The composite structure may be provided as a highly interconnected nanowire supported catalyst structure interpenetrated with en electrolyte network to maximize catalyst utilization, catalyst accessibility, and electrical and ionic connectivity to thereby improve the overall efficiency of fuel cells, at lower cost, etc.

BRIEF SUMMARY OF THE INVENTION

The present invention provides a proton exchange membrane fuel cell with nanostructured components, in particular, one or more of the electrodes of the membrane electrode assembly. The nanostructured fuel cell has a higher catalytic metal utilization rate at the electrodes, higher power density (kW/volume and kW/mass), and lower cost than conventional fuel cells. The nanostructured fuel cells are not only attractive for stationary and mobile applications, but also for use as a compact power supply for microelectronics such as laptops, cell phones, cameras and other electronic devices.

In accordance with a first aspect of the present invention, nanowires (e.g., inorganic nanowires) for use in a membrane electrode assembly of a fuel cell are disclosed which generally comprise a metal catalyst deposited on a surface of the nanowires. The metal catalyst may be deposited as a thin film on the surface of the nanowires, or as a layer of catalyst particles, e.g., by functionalizing the surface of the nanowires with standard surface chemistries. The metal catalyst may be selected from the group comprising one or more of platinum (Pt), ruthenium (Ru), iron (Fe), cobalt (Co), gold (Au), chromium (Cr), molybdenum (Mo), tungsten (W), manganese (Mn), technetium (Tc), rhenium (Re), osmium (Os), rhodium (Rh), iridium (Ir), nickel (Ni), palladium (Pd), copper (Cu), silver (Ag), zinc (Zn), tin (Sn), aluminum (Al), and combinations and alloys thereof (such as bimetallic Pt:Ru nanoparticles). The nanowires may comprise branched structures (e.g., side nodules) to increase the surface area to volume ratio of the wires to maximize the catalytic efficiency of the fuel cell. The nanowires may be made from metallic conducting, semiconducting, carbide, nitride, or oxide materials such as $RuO_2$, SiC, GaN, $TiO_2$, $SnO_2$, $WC_x$, $MoC_x$, ZrC, $WN_x$, $MoN_x$ etc. It is preferable that the nanowires be made from a material that is resistant to degradation in a weak acid so that the nanowires are compatible with the reactants of a variety of different fuel cells.

The nanowires may be derivatized with at least a first functional group or chemical binding moiety which binds to metallic catalyst particles, such as a nitric acid group, carboxylic acid group, a hydroxyl group, an amine group, a sulfonic acid group, and the like, or the catalyst may be deposited as a thin film using other deposition processes such as electrodeposition, atomic layer deposition, plasma sputtering, etc. The nanowires may also be derivatized with a functional group which differentially binds to a thin proton conducting polymer coating (e.g., Nafion® or other sulfonated polymer) which may be deposited directly on the nanowires. For example, the nanowires may be functionalized with a sulfonated hydrocarbon, fluorocarbon, or branched hydrocarbon chain using known standard chemistries. Alternatively, instead of binding ionomer to the nanowires through a chemical binding moiety, the nanowires may be functionalized to make them proton conductive. For example, the nanowires may be functionalized with a surface coating such as a perfluorinated sulfonated hydrocarbon using well-known functionalization chemistries. In this way, the intimate relationship between the nanowire catalyst support and the polymer shell ensures that most, if not all, of the metal catalyst particles are located at a three-phase contact point (e.g., such that the catalyst particles are accessible to the fuel cell reactants, electrolyte and nanowire core for efficient electron and proton conduction). The controlled nanowire surface chemistry can be used to control the wettability of the polymer in the composite nanowire structure and ensures that catalyst particles are exposed and accessible for catalysis.

According to another embodiment of the present invention, a nanostructured catalyst support for a membrane electrode assembly of a fuel cell is disclosed which generally comprises an interconnected mat or network of nanowires each having a metal catalyst deposited thereon. The catalyst metal may comprise any of the catalyst metals previously disclosed such as platinum. The catalyst metal may comprise a combination of metals such as platinum and ruthenium. In one representative embodiment, the catalyst metal comprises nanoparticles having a diameter less than about 50 nm, e.g., less than about 10 nm, e.g., less than about 5 nm, e.g., between about 1 and 5 nm. In this embodiment, each nanowire in the network of nanowires typically is physically and/or electrically connected to at least one or more other nanowires in the nanowire network to form a highly interconnected network of nanowires. In other embodiments, the nanowires may be substantially aligned in a parallel array of nanowires between the anode/cathode bipolar plates and the proton exchange membrane, or the nanowires may be randomly oriented. The nanowires may each be coated with a first catalyst colloid coating and/or a second thin proton conducting polymer coating (e.g., Nafion®). The membrane electrode assembly may be a component in a direct methanol fuel cell, a hydrogen fuel cell, or any other fuel cell known to those of ordinary skill in the art.

A fuel cell is formed by providing a proton exchange membrane, an anode electrode, a cathode electrode, and first and second bipolar plates, wherein at least one of the anode and cathode electrode comprise an interconnected network of the catalyst supported nanowires. Because of the superior connectivity of the nanowire network, the fuel cell may not require a gas diffusion layer between the proton exchange membrane and the first or second bipolar plates as is the case with conventional fuel cells. In one embodiment, the nanowires may be synthesized directly on one or more of the bipolar plates of the fuel cell and/or on the proton exchange membrane. The nanowires may also be grown on a separate growth substrate, harvested therefrom, and then transferred (e.g., as a porous sheet of interconnected wires) and incorporated into the fuel cell structure (e.g., deposited on one or more of the fuel cell components such as one or more of the bipolar plates and/or the proton exchange membrane). When grown in situ on the bipolar plate(s) and/or proton exchange membrane, the nanowires may be oriented substantially perpendicular or normal to a surface of the bipolar plate(s) or proton exchange membrane, or oriented randomly.

The nanowires in the nanowire network are preferentially physically and/or electrically connected to one or more other wires in the network to form an open, highly branched, porous, intertwined structure, with low overall diffusion resistance for reactants and waste diffusion, high structural stability and high electrical connectivity for the electrons to ensure high catalytic efficiency, thus leading to high power density and lower overall cost. The multiple electrical connectivity of the nanowires ensures that if one wire breaks or is damaged in the system, for example, that all points along the wire still connect to the anode (or cathode) electrode along different paths (e.g., via other nanowires in the network). This provides substantially improved electrical connectivity and stability as compared to previous packed particle composite structures. The catalyst is highly accessible to the fuel source to produce electrons and protons, while the electrons can conduct directly to the bipolar plate through the nanowire and the protons can transport directly to the membrane through the polymer.

The nanowires in the network of nanowires may be cross-linked or fused together using various cross-linking or sintering methods described further herein at points where such nanowires contact or are proximal to others of the nanowires to increase the connectivity and structural stability of the nanowire network. In another embodiment, the same strategy of cross-linking or sintering can be used to improve the electrical or structural connectivity between the nanowires and catalyst material that is in contact or proximal with such nanowires.

The nanowire network defines a plurality of pores between the nanowires in the network, wherein the plurality of pores preferentially have an effective pore size of less than about 10 μm, for example, less than about 5 μm, e.g., less than about 1 μm, e.g., less than about 0.2 μm, e.g., less than 0.02 μm, e.g., between about 0.002 μm and 0.02 μm, e.g., between about 0.005 and 0.01 μm. The overall porosity of the branched nanowire structure may be greater than about 30%, for example, between about 30% and 95%, e.g., between about 40% and 60%. The nanowires are dispersed in a porous polymer matrix electrolyte material such as perfluorosulfonic acid/PTFE copolymer (e.g., Nafion®) which forms a continuous network interpenetrated with the nanowires in the branched nanowire network to provide sufficient contact points for proton (e.g., H+) transport.

In another embodiment of the present invention, a method for preparing a fuel cell membrane electrode is disclosed which generally comprises (a) associating a catalyst metal selected from the group comprising one or more of chromium (Cr), molybdenum (Mo), tungsten (W), manganese (Mn), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), tin (Sn), aluminum (Al), and combinations thereof, with a plurality of inorganic nanowires to form a plurality of inorganic nanowires with associated catalyst metal, and (b) forming a membrane electrode comprising a plurality of inorganic nanowires with associated catalyst metal.

The plurality of inorganic nanowires may be derivatized with at least a first functional group which binds the catalyst metal such as a nitric acid group, a carboxylic acid group, a hydroxyl group, an amine group, a sulfonic acid group, and the like. The associating may also be done by a variety of methods selected from the group comprising chemical vapor deposition, electrochemical deposition, physical vapor deposition, solution impregnation and precipitation, colloid particle absorption and deposition, atomic layer deposition, and combinations thereof. For example, the associating may be done by chemical deposition of a catalyst metal precursor such as chloroplatinic acid or by electrodeposition of Pt from a precursor salt in solution. The catalyst metal precursor may be converted to a catalytically active metal by subjecting the catalyst metal precursor to metal reduction, wherein metal reduction is done by a method selected from the group comprising hydrogen reduction, chemical reduction, electrochemical reduction and a combination thereof. The catalytically active metal may be in the form of metal nanoparticles on the surface of the nanowires. The forming may be done on a proton exchange membrane or on one or more of the bipolar plates, for example, by a method selected from the group comprising spray/brush painting, solution coating, casting, electrolytic deposition, filtering a fluid suspension of the nanowires, and combinations thereof. The nanowires may also be grown directly on one or more of the fuel cell components such as one or more of the bipolar plates and/or proton exchange membrane. The method may further comprise mixing an ionomeric resin (e.g., perfluorosulfonic acid/PTFE copolymer, e.g., Nafion) with the plurality of inorganic nanowires with associated catalyst metal. The plurality of inorganic nanowires may be derivatized with at least a second functional group (e.g., a sulfonated hydrocarbon group) which binds the ionomeric resin.

In another embodiment of the present invention, a method of making a membrane electrode assembly of a fuel cell is disclosed which generally comprises: forming nanowires on a growth substrate; transferring the nanowires from the growth substrate into a fluid suspension; depositing one or more catalyst metals on the nanowires to form a nanowire supported catalyst; filtering the fluid suspension of nanowires to create a porous sheet of interconnected nanowires; infiltrating the network of nanowires with an ionomeric resin; and combining the sheet of interconnected nanowires with a proton exchange membrane to form a membrane electrode assembly (MEA). Hot pressing may be used to fuse electrolyte in both the anode and cathode electrode with the proton exchange membrane to form a continuous electrolyte phase for efficient proton transport from the anode electrode to the cathode electrode. The step of depositing one or more catalyst metals may comprise, for example, depositing a metal selected from the group comprising platinum, gold, ruthenium, and other metals, and combinations thereof. The method may further comprise forming a proton exchange membrane fuel cell utilizing the formed MEA by combining first and second bipolar plates together to form the proton exchange membrane fuel cell.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

BRIEF DESCRIPTION OF THE DRAWINGS

FIG. 1 is a schematic representation of a conventional electrochemical fuel cell showing exemplary reactions in the anode and the cathode electrodes;

FIG. 2A is an expanded view of the anode electrode portion of the fuel cell of FIG. 1 showing details of a conventional packed particle composite catalyst structure comprising Pt/Ru nanoparticles provided on a carbon particle support;

FIG. 2B is an expanded view of the packed particle composite catalyst structure of FIG. 2A showing an exemplary three-phase contact between the gaseous reactants, electrolyte, and the electrocatalyst structure;

DETAILED DESCRIPTION OF THE INVENTION

Figure 3A:
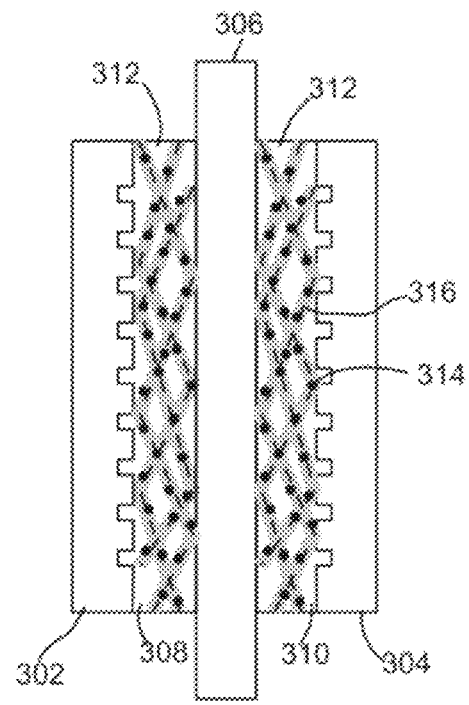
FIG. 3A is a schematic representation of a nanowire-based electrochemical fuel cell made according to the teachings of the present invention.

The membrane electrode assemblies and fuel cells of the present invention gain significant unique properties by incorporating nanowires in their component structures. The term "nanowire" generally denotes an elongated structure having an aspect ratio (length:width) of greater than 10, preferably greater than 100 and in many cases 1000 or higher. These nanowires typically have a cross sectional dimension, e.g., a diameter that is less than 500 nm and preferably less than 100 nm and in many cases, less than 50 nm, e.g., above 1 nm.

The composition of the nanowires employed in the invention may vary. By way of example, nanowires may be comprised of organic polymers, ceramics, inorganic semiconductors such as carbides and nitrides, and oxides (such as $TiO_2$ or ZnO), carbon nanotubes, biologically derived compounds, e.g., fibrillar proteins, etc. or the like. For example, in certain embodiments, inorganic nanowires are employed, such as semiconductor nanowires. Semiconductor nanowires can be comprised of a number of Group IV, Group III-V or Group II-VI semiconductors or their oxides. In one embodiment, the nanowires may include metallic conducting, semiconducting, carbide, nitride, or oxide materials such as $RuO_2$, SiC, GaN, $TiO_2$, $SnO_2$, $WC_x$, $MoC_x$, ZrC, $WN_x$, $MoN_x$ etc. It is preferable that the nanowires be made from a material that is resistant to degradation in a weak acid so that the nanowires are compatible with are compatible with the reactants of a variety of different fuel cells. Nanowires according to this invention can expressly exclude carbon nanotubes, and, in certain embodiments, exclude "whiskers" or "nanowhiskers", particularly whiskers having a diameter greater than 100 nm, or greater than about 200 nm.

Typically, the nanowires employed are produced by growing or synthesizing these elongated structures on substrate surfaces. By way of example, published U.S. Patent Application No. US-2003-0089899-A1 discloses methods of growing uniform populations of semiconductor nanowires from gold colloids adhered to a solid substrate using vapor phase epitaxy. Greene et al. ("Low-temperature wafer scale production of ZnO nanowire arrays", L. Greene, M. Law, J. Goldberger, F. Kim, J. Johnson, Y. Zhang, R. Saykally, P. Yang, Angew. Chem. Int. Ed. 42, 3031-3034, 2003) discloses an alternate method of synthesizing nanowires using a solution based, lower temperature wire growth process. A variety of other methods are used to synthesize other elongated nanomaterials, including the surfactant based synthetic methods disclosed in U.S. Pat. Nos. 5,505,928, 6,225,198 and 6,306,736, for producing shorter nanomaterials, and the known methods for producing carbon nanotubes, see, e.g., US-2002/0179434 to Dai et al., as well as methods for growth of nanowires without the use of a growth substrate, see, e.g., Morales and Lieber, Science, V.279, p. 208 (Jan. 9, 1998). As noted herein, any or all of these different materials may be employed in producing the nanowires for use in the invention. For some applications, a wide variety of group III-V, II-VI and group IV semiconductors may be utilized, depending upon the ultimate application of the substrate or article produced. In general, such semiconductor nanowires have been described in, e.g., US-2003-0089899-A1, incorporated herein above. In certain embodiments, the nanowires are selected from a group consisting of: Si, Ge, Sn, Se, Te, B, Diamond, P, B—C, B—P(BP6), B—Si, Si—C, Si—Ge, Si—Sn and Ge—Sn, SiC, BN/BP/BAs, AlN/AlP/AlAs/AlSb, GaN/GaP/GaAs/GaSb, InN/InP/InAs/InSb, BN/BP/BAs, AlN/AlP/AlAs/AlSb, GaN/GaP/GaAs/GaSb, InN/InP/InAs/InSb, ZnO/ZnS/ZnSe/ZnTe, CdS/CdSe/CdTe, HgS/HgSe/HgTe, BeS/BeSe/BeTe/MgS/MgSe, GeS, GeSe, GeTe, SnS, SnSe, SnTe, PbO, PbS, PbSe, PbTe, CuF, CuCl, CuBr, CuI, AgF, AgCl, AgBr, AgI, $BeSiN_2$, $CaCN_2$, $ZnGeP_2$, $CdSnAs_2$, $ZnSnSb_2$, $CuGeP_3$, $CuSi_2P_3$, $(Cu, Ag)(Al, Ga, In, Tl, Fe)(S, Se, Te)_2$, $Si_3N_4$, $Ge_3N_4$, $Al_2O_3$, $(Al, Ga, In)_2(S, Se, Te)_3$, $Al_2CO$, and an appropriate combination of two ore more such semiconductors.

In the cases of semiconductor nanowires, the nanowires may optionally comprise a dopant to increase the conductivity of the nanowire catalyst support. The dopant may be selected from a group consisting of: a p-type dopant from Group III of the periodic table; an n-type dopant from Group V of the periodic table; a p-type dopant selected from a group consisting of: B, Al and In; an n-type dopant selected from a group consisting of: P, As and Sb; a p-type dopant from Group II of the periodic table; a p-type dopant selected from a group consisting of: Mg, Zn, Cd and Hg; a p-type dopant from Group IV of the periodic table; a p-type dopant selected from a group consisting of: C and Si.; or an n-type is selected from a group consisting of: Si, Ge, Sn, S, Se and Te.

Additionally, such nanowires may be homogeneous in their composition, including single crystal structures, or they may be comprised of heterostructures of different materials, e.g., longitudinal heterostructures that change composition over their length, or coaxial heterostructures that change composition over their cross section or diameter. Such coaxial and longitudinal heterostructured nanowires are described in detail in, e.g., Published International Patent Application No. WO 02/080280, which is incorporated herein by reference for all purposes.

Furthermore, as disclosed in greater detail in co-pending, co-assigned provisional Patent Application No. 60/738,100, filed Nov. 21, 2005, the entire contents of which are incorporated by reference herein, nanowire structures with multiple shells can also be fabricated, such as, for example, a conducting inner core wire (which may or may not be doped) (e.g., to impart the necessary conductivity for electron transport) and one or more outer-shell layers that provide a suitable surface for binding catalyst (and/or polymer electrolyte). For example, in one embodiment, a multi-layer or multi-walled carbon nanotube (MWNT) can be formed in which the outermost shell layer is converted to silicon carbide to provide a surface (SiC) to bind catalyst (and/or polymer electrolyte) and a conductive carbon nanotube core to impart the necessary conductivity. In alternative embodiments, the core may consist of heavily doped material such as doped silicon, and a shell of a carbide, nitride etc. material (e.g., SiC) may then be formed on the core. The use of silicon as the core material leverages the extensive experience and infrastructure known for fabricating silicon nanowires. A carbide shell, such as SiC, WC, MoC or mixed carbide (e.g. WSiC) may be formed around the core material using a controlled surface reaction. SiC, WC and MoC are known for their high conductivity and chemical stability. In addition, these materials have been shown to have catalytic properties similar to those of precious metals, such as Pt, for methanol oxidation, and therefore may provide further performance enhancements in the nanowire bird's nest MEA. The precursor materials for the shell may be deposited on the core nanowire surface (e.g., silicon) by atomic layer deposition (ALD) and then converted to the carbide by high-temperature carbothermal reduction, for example.

Synthesis of core-shell nanowire (and other nanocrystal) heterostructures are described in, e.g., Berkeley U.S. Patent Application Pub. No. 20020172820; co-assigned U.S. Pat. No. 7,339,184; Peng et al. (1997) "Epitaxial growth of highly luminescent CdSe/CdS core/shell nanocrystals with photostability and electronic accessibility" J. Am. Chem. Soc. 119, 7019-7029; Dabbousi et al. (1997) "(CdSe)ZnS core-shell quantum dots: Synthesis and characterization of a size series of highly luminescent nanocrysallites" J. Phys. Chem. B 101, 9463-9475; Manna et al. (2002) "Epitaxial growth and photochemical annealing of graded CdS/ZnS shells on colloidal CdSe nanorods" J. Am. Chem. Soc. 124, 7136-7145, the entire contents of each of which are incorporated by reference herein. Similar approaches can be applied to the growth of other core-shell nanostructures including nanowires.

In one embodiment of the invention, the nanowire portion of the anode (and/or cathode) electrode of the invention may be synthesized on a growth substrate, and then transferred and incorporated into the membrane electrode assembly structure of the fuel cell. For example, in certain aspects, inorganic semiconductor or semiconductor oxide nanowires are grown on the surface of a growth substrate using a colloidal catalyst based VLS synthesis method described above. In accordance with this synthesis technique, the colloidal catalyst (e.g., gold, platinum etc. particles) is deposited upon the desired surface of the substrate. The substrate including the colloidal catalyst is then subjected to the synthesis process which generates nanowires attached to the surface of the substrate. Other synthetic methods include the use of thin catalyst films, e.g., 50 nm or less, deposited over the surface of the substrate. The heat of the VLS process then melts the film to form small droplets of catalyst that forms the nanowires. Typically, this latter method may be employed where fiber diameter homogeneity is less critical to the ultimate application. Typically, catalysts comprise metals, e.g., gold or platinum, and may be electroplated or evaporated onto the surface of the substrate or deposited in any of a number of other well known metal deposition techniques, e.g., sputtering etc. In the case of colloid deposition the colloids are typically deposited by first treating the surface of the substrate so that the colloids adhere to the surface. Such treatments include those that have been described in detail previously, i.e., polylysine treatment, etc. The substrate with the treated surface is then immersed in a suspension of colloid.

Following growth of the nanowires, the nanowires are then harvested from their synthesis location. The free standing nanowires are then introduced into or deposited upon the relevant surface of the fuel cell component such as the bipolar plate(s) or proton exchange membrane, for example, by a method selected from spray/brush painting, solution coating, casting, electrolytic deposition, filtering a fluid suspension of the nanowires, and combinations thereof. For example, such deposition may simply involve immersing the component of interest (e.g., one or more of the bipolar plates or the proton exchange membrane) into a suspension of such nanowires, or may additionally involve pre-treating all or portions of the component to functionalize the surface or surface portions for wire attachment. As described further below, the nanowires may also be introduced into a solution (e.g., methanol or water), filtered (e.g., vacuum filtered over a polyvinylidene fluoride (PVDF) membrane) to give them a dense, intertwined mat or "bird's nest structure," removed from the filter after drying and washing, and then heat treated (e.g., annealed) at high temperatures. The resulting porous sheet of interconnected nanowires can then be incorporated into the membrane electrode assembly of the fuel cell. A variety of other deposition methods, e.g., as described in U.S. Patent Application Publication No. 20050066883, published Mar. 31, 2005, and U.S. Pat. No. 6,962,823, the full disclosures of which are incorporated herein by reference in their entirety for all purposes. As explained further below, the nanowires may also be grown directly on one or more of the fuel cell components such as one or more of the bipolar plates and/or proton exchange membrane.

Typically, as shown in FIG. 1, a fuel cell 100 generally comprises an anode electrode 102, a cathode electrode 104, and a proton exchange membrane (PEM) 106. The assembly of these three components is generally referred to as a membrane electrode assembly (MEA). As described previously, if methanol is used as fuel, liquid methanol ($CH_3OH$) is oxidized in the presence of water at the anode 102 generating $CO_2$, hydrogen ions and the electrons that travel through the external circuit 108 as the electric output of the fuel cell. The hydrogen ions travel through the electrolyte membrane 106 and react with oxygen from the air and the electrons from the external circuit 108 to form water at the cathode completing the circuit. Anode and cathode electrodes 102, 104 each contact bipolar plates 110, 112, respectively. The bipolar plates 110, 112 typically have channels and/or grooves in their surfaces that distribute fuel and oxidant to their respective catalyst electrodes, allow the waste, e.g., water and $CO_2$ to get out, and may also contain conduits for heat transfer. Typically, bipolar plates are highly electrically conductive and can be made from graphite, metals, conductive polymers, and alloys and composites thereof. Materials such as stainless steel, aluminum alloys, carbon and composites, with or without coatings, are good viable options for bipolar end plates in PEM fuel cells. Bipolar plates can also be formed from composite materials comprising highly-conductive or semiconducting nanowires incorporated in the composite structure (e.g., metal, conductive polymer etc.). The shape and size of the components of the fuel cell can vary over a wide range depending on the particular design.

In another embodiment, nanowires may be deposited (e.g., grown) on one or more of the bipolar plates to provide a high surface area electrode plate with low flow resistance for methanol (or other fuel cell gas or liquid reactants) and waste products through it. A more complete description of nanowire structures having enhanced surface areas, as well as to the use of such nanowires and nanowire structures in various high surface area applications, is provided in U.S. Ser. No. 10/792,402 entitled "Nanofiber Surfaces for use in Enhanced Surface Area Applications," filed Mar. 2, 2004, the entire contents of which are incorporated by reference herein.

At present, the most commonly used electrode catalyst is Pt or Pt:Ru particles 202 supported on carbon particles 204 (e.g., made from carbon black) which are dispersed in an electrolyte film 206 as shown in the expanded view of the anode 102 in FIG. 2A. One of the challenges in the commercialization of proton exchange membrane fuel cells (PEMFCs) is the high cost of the precious metals used as the catalyst (e.g., Pt or Ru). Decreasing the amount of Pt used in a PEMFC by increasing the utilization efficiency of Pt has been one of the major concerns during the past decade. To effectively utilize the Pt catalyst, the Pt should have simultaneous contact to the reactant gases (or reactant solutions or liquids), the electrolyte (e.g., proton conducting film), and the carbon particles (e.g., electron-conducting element). As shown in FIG. 2B, an effective electrode in a fuel cell requires a 4-phase-contact 208 in the catalyst layer between the reactant gases/liquid, active metal particles, carbon support 202, 204, and the electrolyte 206. A preferred catalyst layer allows the facile transport of reactant gases (e.g., methanol, MeOH:$H_2O$, hydrogen and/or oxygen), solutions, or liquids, facile transport of electrons to/from the external circuit and protons to/from the proton exchange membrane.

The carbon particles conduct electrons and the perfluorosulfonate ionomer (e.g., Nafion®) conducts protons. As noted previously, in conventional packed particle composite systems as shown in FIGS. 2A-B, there is a significant portion of Pt (or Pt:Ru) that is isolated from the external circuit and/or the PEM, resulting in a low Pt utilization. For example, current packed particle composites only utilize about 20 to 30% of the catalyst particles. The inaccessibility to some catalyst sites can be due, for example, to the fact that the necessary addition of the solubilized perfluorosulfonate ionomer (e.g., Nafion®) for proton transport tends to wash away or isolate carbon particles in the catalyst layer, leading to poor electron transport. Thus, most DMFCs which utilize packed particle composite structures are highly inefficient.

Due to their unique structural, mechanical, and electrical properties, the inventors of the present application have discovered that nanowires can be used to replace traditional carbon particles in PEMFCs as the catalyst support and electron conducting medium to make MEAs. Because the generation of surface functional groups on nanowires, e.g., nanowires such as SiC or GaN, is relatively straightforward, catalyst nanoparticles such as Pt and/or Pt:Ru (as well as a proton conducting polymer (e.g., Nafion)), can be facilely deposited on the nanowires, e.g., without agglomeration of the particles. Each catalyst particle is then directly connected to the anode (and cathode) through the nanowire core. The multiple electrical connectivity of the interconnected nanowires secures the electronic route from Pt to the electron conducting layer. The use of nanowires and the resulting guaranteed electronic pathway eliminate the previously mentioned problem with conventional PEMFC strategies where the proton conducting medium (e.g., Nafion) would isolate the carbon particles in the electrode layer. Eliminating the isolation of the carbon particles supporting the electrode layer improves the utilization rate of Pt.

Figure 3B:
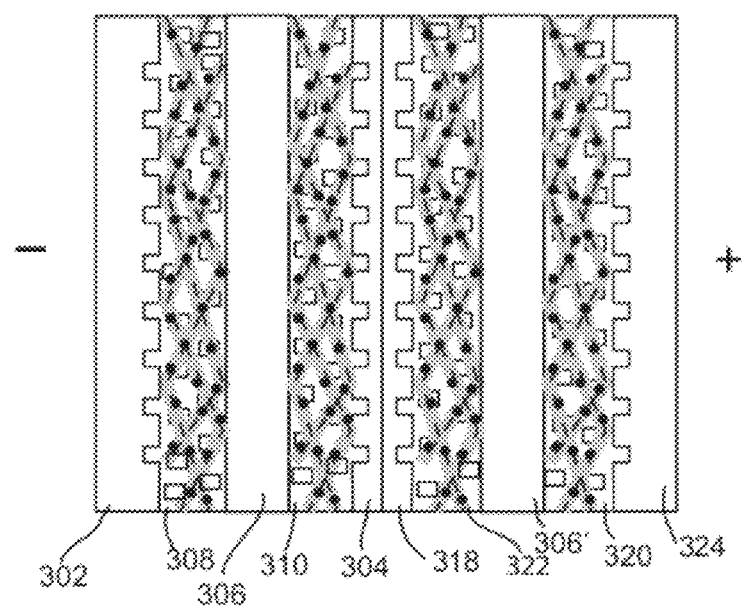
FIG. 3B is a schematic representation of a nanowire-based electrochemical fuel cell stack made according to the teachings of the present invention

As shown now with reference to FIG. 3A, a nanowire-based fuel cell is shown which includes an anode bipolar electrode plate 302, a cathode bipolar electrode plate 304, a proton exchange membrane 306, an anode electrode 308, a cathode electrode 310, and an interconnecting network of nanowires 312 positioned between both the anode electrode 308 and cathode electrode 310 on one side, and the proton exchange membrane 306 on the other side of the fuel cell. Generally, a plurality of fuel cells or MEAs as shown in FIG. 3A can be combined to form a fuel cell stack as shown, for example, in FIG. 3B having separate anode electrodes 308, 320 and cathode electrodes 310, 322 separated by respective proton exchange membranes 306 and 306', respectively. The cells within the stacks are connected in series by virtue of the bipolar plates 302, 304, 318, and 324 such that the voltages of the individual fuel cells are additive.

Figure 4A:
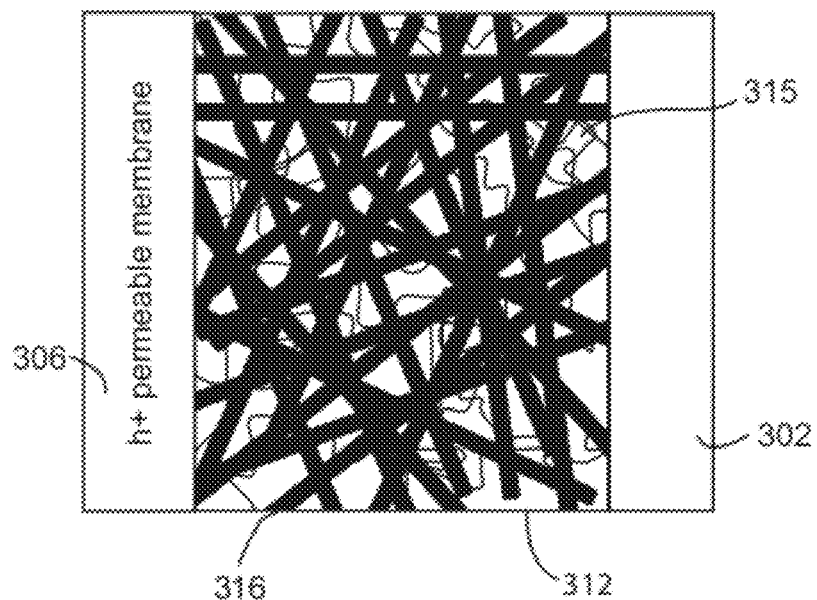
FIG. 4A is an expanded view of the anode electrode portion of the fuel cell of FIG. 3 showing details of an embodiment of an interconnected network of catalyst supported nanowires which span the junction between the proton exchange membrane and anode electrode of the fuel cell of FIG. 3.
Figure 5:
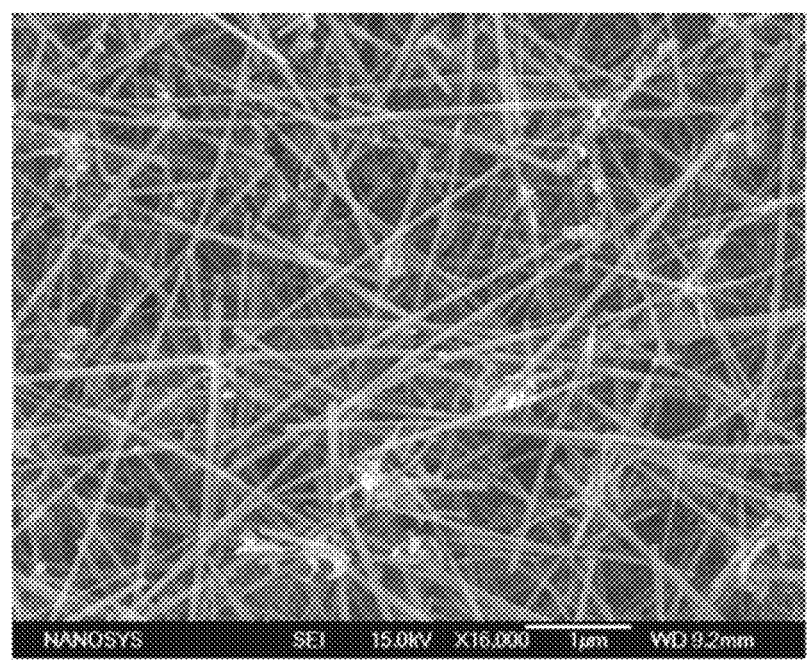
FIG. 5 is a SEM image of an interconnected network of nanowires used as the catalyst support in an anode (and/or cathode) electrode of a fuel cell made according to the teachings of the present invention.

As shown in FIGS. 3A, 4A and in the SEM image of FIG. 5, the nanowires 316 in the nanowire networks 312 each are physically and/or electrically connected to one or more other wires in the network to form an open, highly branched, porous, intertwined structure, with low overall diffusion resistance for reactants and waste diffusion, high structural stability and high electrical connectivity for the electrons to ensure high catalytic efficiency, thus leading to high power density and lower overall cost. It is important to note that even if two wires are not in actual direct physical contact with each other (or with a catalyst particle), it is possible that at some small distance apart, they may still be able to transfer changes (e.g., be in electrical contact). Preferentially, each nanowire is physically and/or electrically connected to at least one or more other nanowire in the network. The multiple connectivity of the nanowires ensures that if one wire breaks or is damaged in the system, for example, that all points along the wire still connect to the anode (and cathode) electrode along different paths (e.g., via other nanowires in the network). This provides substantially improved electrical connectivity and stability as compared to previous packed particle composite structures. The wires may extend all the way (or only part way) between the anode (and cathode) bipolar plate and the proton exchange membrane. In the case where the wires do not extend all the way between a bipolar plate and the membrane, the wires may extend from the bipolar plate toward the membrane, but not reach the membrane, and the polymer electrolyte can extend from the membrane toward the bipolar plate, but not reach the bipolar plate (but not the other way around) to ensure that electrons are efficiently transferred to the anode, and protons are transferred towards the cathode.

Figure 6:
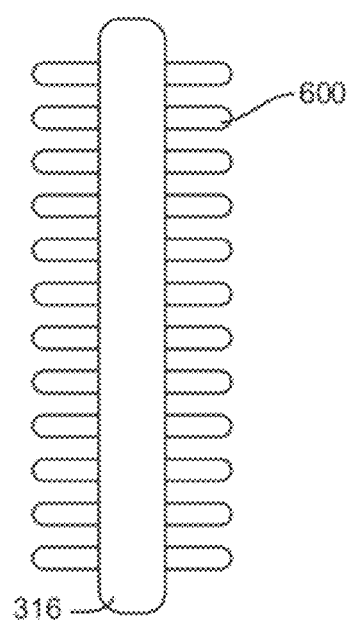
FIG. 6 is a schematic representation of a branched nanowire structure that can be used in practicing the methods of the present invention.
Figure 7:
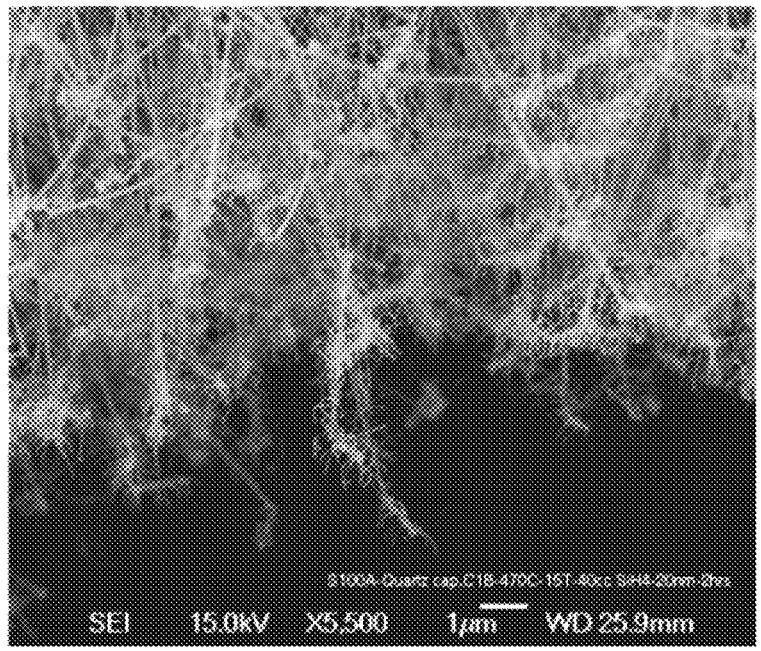
FIG. 7 is an SEM image of a branched nanowire network including a plurality of branched nanowires having tiny nodules extending from the side surfaces of the nanowires.

The nanowires in the nanowire network may optionally have a branched structure and include a plurality of nodules 600 which extend from side surfaces of the nanowire as shown in FIG. 6 and in the SEM image of FIG. 7. The nodules 600 on the sides of the nanowire core can further increase available surface area for catalysis without substantially impacting the connectivity or porosity of the nanowire network.

The nanowires 316 are dispersed in a polymer electrolyte material 315 (e.g., see FIG. 4A) which coats the surface of nanowires in the branched nanowire network to provide sufficient contact points for proton (e.g., H+) transport. Polymer electrolytes can be made from a variety of polymers including, for example, polyethylene oxide, poly (ethylene succinate), poly (beta.-propiolactone), and sulfonated fluoropolymers such as Nafion® (commercially available from DuPont Chemicals, Wilmington). A suitable cation exchange membrane is described in U.S. Pat. No. 5,399,184, for example, incorporated herein by reference. Alternatively, the proton conductive membrane can be an expanded membrane with a porous microstructure where an ion exchange material impregnates the membrane effectively filling the interior volume of the membrane. U.S. Pat. No. 5,635,041, incorporated herein by reference, describes such a membrane formed from expanded polytetrafluoroethylene (PTFE). The expanded PTFE membrane has a microstructure of nodes interconnected by fibrils. Similar structures are described in U.S. Pat. No. 4,849,311, incorporated herein by reference.

The porous structure of the interconnected nanowire network provides an open (non-tortuous) diffusion path for fuel cell reactants to the catalyst (e.g., catalyst particles 314) deposited on the nanowires 316 as described further below. The void spaces between the interconnected nanowires form a highly porous structure. The effective pore size will generally depend upon the density of the nanowire population, as well as the thickness of electrolyte layer, and to some extent, the width of the nanowires used. All of these parameters are readily varied to yield a nanowire network having a desired effective porosity. For example, preferred nanowire networks have a porosity adequate to provide for an even flow of reactants while maintaining adequate electrical conductivity and mechanical strength. Also, the porosity of the nanowire network provides for water management within the cell. The branched nanowire network preferably is sufficiently porous to pass fuel gases and water vapor through it without providing a site for water condensation that would block the pores of the network and prevent vapor transport. The mean pore size generally ranges from about 0.002 microns to about 10.0 microns, e.g., less than about 1 µm, e.g., less than about 0.2 µm, e.g., less than about 0.02 µm, e.g., between about 0.002 µm and 0.02 µm, e.g., between about 0.005 and 0.01 µm. The total porosity of the branched nanowire structure may be easily controlled between about 30% to 95%, for example, e.g., between about 40% to 60%, while still ensuring electrical connectivity to the anode and cathode electrodes.

Figure 8:
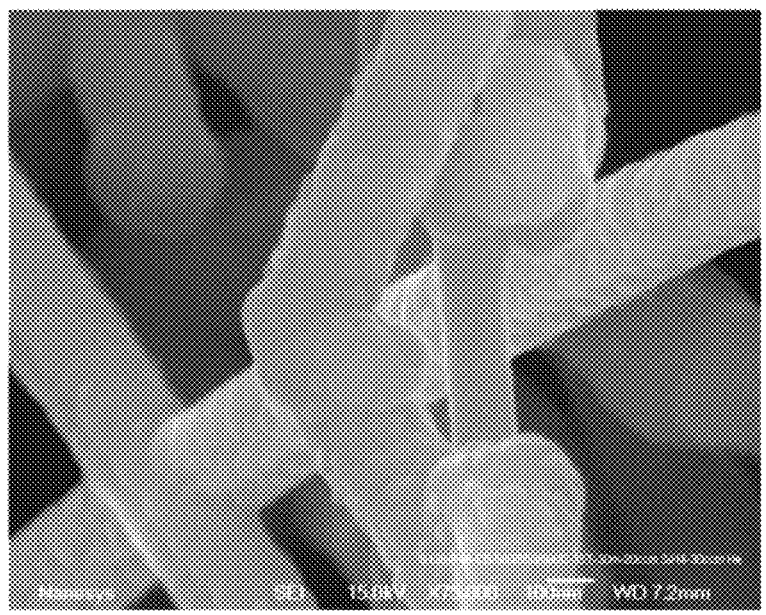
FIG. 8 is an SEM image at high magnification of crosslinked or fused nanowires creating an interconnecting nanowire network as used in certain aspects of the present invention.

The nanowires 316 which form the interconnected nanowire networks 312 may optionally be fused or cross-linked at the points where the various wires contact each other, to create a more stable, robust and potentially rigid membrane electrode assembly. The nanowires may also include surface chemical groups that may form chemical cross-links in order to cross-link the underlying nanowires. For example, the nanowires may be cross-linked or fused together by depositing a small amount of conducting or semiconducting material at their cross-points. For example, SiC nanowires (or, e.g., carbon nanotube nanowires having a SiC shell layer) can be cross-linked by depositing amorphous or polycrystalline SiC at their cross-points. FIG. 8 is an SEM micrograph showing a plurality of silicon nanowires which have been fused together using deposited polysilicon at their cross-points. One of skill in the art will appreciate that other metals, semimetals, semiconductors, and semiconductor oxides could also be used to cross-link these intersections.

Figure 4B:
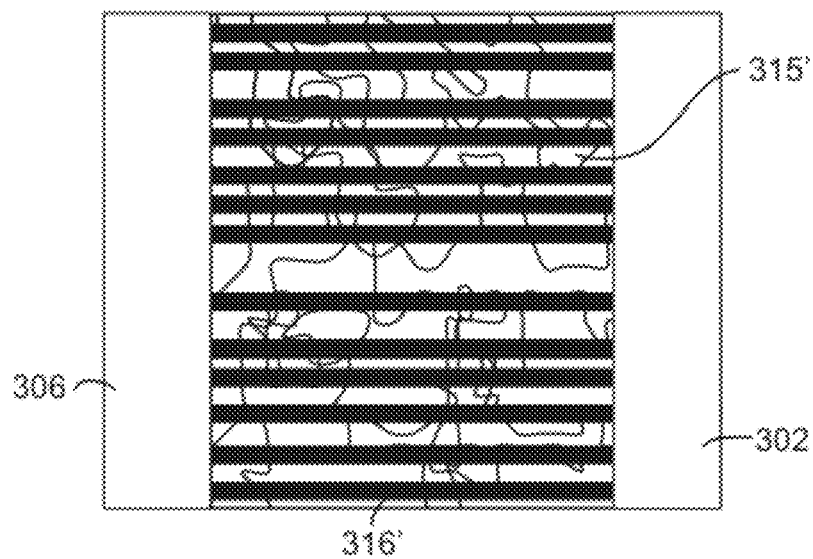
FIG. 4B is an expanded view of an alternative embodiment for a nanowire-based anode portion of a fuel cell showing details of a parallel array of catalyst supported nanowires which span the junction between the proton exchange membrane and the anode electrode of the fuel cell of FIG. 3.

In another aspect of the present invention shown with reference to FIG. 4B, nanowires 316' may be provided as a parallel array of aligned wires having electrolyte 315' interspersed between the free spaces between the aligned wires. In this particular implementation of the present invention, the parallel array of nanowires is preferably synthesized in situ, e.g., on the surface of the bipolar electrode plate(s) 302 and/or 304 (and/or the proton exchange membrane 306). It is to be understood that the randomly oriented, interconnected network 312 of wires 316 shown in FIGS. 3A, 4A and 5 and described above can also be grown in situ directly on the bipolar plates 302, 304 (and/or proton exchange membrane) using the techniques described herein. For example, inorganic semiconductor or semiconductor oxide nanowires may be grown directly on the surface of the electrode plate using a colloidal catalyst based VLS synthesis method described above. In accordance with this synthesis technique, the colloidal catalyst is deposited upon the desired surface of the bipolar plate. The bipolar plate including the colloidal catalyst is then subjected to the synthesis process which generates nanowires attached to the surface of the plate. Other synthetic methods include the use of thin catalyst films, e.g., 50 nm or less, deposited over the surface of the bipolar plate. The heat of the VLS process then melts the film to form small droplets of catalyst that forms the nanowires. Typically, this latter method may be employed where wire diameter homogeneity is less critical to the ultimate application. Typically, catalysts comprise metals, e.g., gold of platinum, and may be electroplated or evaporated onto the surface of the electrode plate or deposited in any of a number of other well known metal deposition techniques, e.g., sputtering etc. In the case of colloid deposition the colloids are typically deposited by first treating the surface of the electrode plate so that the colloids adhere to the surface. The plate with the treated surface is then immersed in a suspension of colloid.

In another aspect of the invention, the anode electrode 308 (and cathode electrode 310) may include a conductive grid or mesh made from any of a variety of solid or semisolid materials such as organic materials, e.g., conductive polymers, carbon sheets, etc., inorganic materials, e.g., semiconductors, metals such as gold, semimetals, as well as composites of any or all of these, upon which the nanowires 316 may be attached, but through which apertures exist. Such meshes provide relatively consistent surfaces in a ready available commercial format with well defined screen/pore and wire sizes. A wide variety of metal meshes are readily commercially available in a variety of such screen/pore and wire sizes. Alternatively, metal substrates may be provided as perforated plates, e.g., solid metal sheets through which apertures have been fabricated. Fabricating apertures in meal plates may be accomplished by any of a number of means. For example relatively small apertures, e.g., less than 100 µm in diameter, may be fabricated using lithographic and preferably photolithographic techniques. Similarly, such apertures may be fabricated using laser based techniques, e.g., ablation, laser drilling, etc. For larger apertures, e.g., greater than 50-100 µm, more conventional metal fabrication techniques may be employed, e.g., stamping, drilling or the like. As formed, the metal grids or meshes with the nanowires formed or deposited thereon by the methods disclosed herein may be deposited on the proton exchange membrane, bipolar plate(s), and or embedded within one or more of the electrode layers to provide a porous network with a high surface area nanowire catalyst support attached thereto for efficient catalysis. Other examples of a variety grids or meshes with nanowires deposited thereon which can be used in the present invention are fully disclosed in U.S. patent application Ser. No. 10/941, 746, entitled "Porous Substrates, Articles, Systems and Compositions Comprising Nanofibers and Methods of Their Use and Production," filed on Sep. 15, 2004, the entire contents of which are incorporated by reference herein.

The nanowire network thus formed by any of the previously disclosed methods is employed as the support for the subsequent metal (e.g., platinum, ruthenium, gold, or other metal described below) catalyst, which may be coated or deposited, for example, on the nanowires. Appropriate catalysts for fuel cells generally depend on the reactants selected. For example, the metallic catalyst may be selected from the group comprising one or more of platinum (Pt), ruthenium (Ru), iron (Fe), cobalt (Co), gold (Au), chromium (Cr), molybdenum (Mo), tungsten (W), manganese (Mn), technetium (Tc), rhenium (Re), osmium (Os), rhodium (Rh), iridium (Ir), nickel (Ni), palladium (Pd), copper (Cu), silver (Ag), zinc (Zn), tin (Sn), aluminum (Al), and combinations and alloys thereof (such as bimetallic Pt:Ru nanoparticles). Suitable catalyst materials for oxidation of hydrogen or methanol fuels specifically include metals such as, for example, Pd, Pt, Ru, Rh and alloys thereof.

The catalyst may be deposited or otherwise associated with the nanowire surface as a thin film (e.g., less than about 10 angstroms in thickness) (or a series of catalyst particles) by using a variety of catalyst deposition techniques including, for example, chemical vapor deposition, electrochemical deposition (e.g., electroplating or electroless chemical plating), physical vapor deposition, solution impregnation and precipitation, colloid particle absorption and deposition, atomic layer deposition, and combinations thereof. The amount of the catalyst metal coated by the methods described above is preferably in the range of about 10-85% by weight, more preferably, 20-40% by weight, based on the total amount of catalyst metal and nanowire material.

Alternatively, in one particular embodiment as shown with reference to FIGS. 3A and 4A-B, the catalyst may be deposited on the nanowire surface in solution as a plurality of nanometer-sized metallic catalyst particles 314 (e.g., between about 1 and 50 nm in diameter, e.g., less than about 10 nm in diameter, e.g., between about 1 and 5 nm in diameter), e.g., by derivatizing the nanowire external surface with one or more functional linker moieties (e.g., a chemically reactive group) such as one or more carboxylic acid groups, nitric acid groups, hydroxyl groups, amine groups, sulfonic acid groups, and the like. The catalysts particles (or film) can be attached to the wires either uniformly or non-uniformly. The catalyst particles can be spherical, semi-spherical or non-spherical. The catalyst particles can form islands on the surface of the nanowires or can form a continuous coating on the surface of the nanowire such as in a core-shell arrangement, or stripes or rings along the length of the nanowire, etc. The catalyst particles may be attached to the nanowire surface before or after the nanowire network is incorporated/deposited into the MEA of the fuel cell. In one embodiment, the catalyst particles may be selected from a population of catalyst particles having a uniform size distribution of less than about 50%, for example, less than about 30%, for example, less than about 20%.

When a chemical linker molecule is used to bind the catalyst to the nanowire, the chemical linker can be selected to promote electrical connection between the catalyst and the wire, or the chemical linker can be subsequently removed to promote electrical connection. For example. heat, vacuum, chemical agents or a combination thereof, may optionally be applied to the nanowires to cause the linker molecule to be removed to place the catalyst in direct physical contact with the wire to form a solid electrical connection between the catalyst particles and the nanowire. The structure can also be heated to anneal the interface between the catalyst and the wire in order to improve the electrical contact therebetween.

In addition to the conductive catalyst particles, fillers can be used to alter the physical properties of the nanowire composite structures useful in the invention. Appropriate fillers include, e.g. silica ($SiO_2$), powdered polytetrafluoroethylene and graphite fluoride (CFO. The polymer films preferably can include up to about 20 percent by weight fillers, and more preferably from about 2 to about 10 percent by weight fillers. The fillers are generally in the form of particles.

Following catalyst deposition, a proton conducting polymer such as Nafion may optionally be deposited on the nanowire surface between catalyst particle sites, for example, by functionalizing the surface of the nanowire with a second functional group (different from the catalyst functional group, when used) that preferentially binds the electrolyte or which promotes consistent and/or controlled wetting. The polymer can either be a continuous or discontinuous film on the surface of the nanowire. For example, the polymer electrolyte can be uniformly wetted on the surface of the wires, or can form point-contacts along the length of the wire. The nanowires may be functionalized with a sulfonated hydrocarbon molecule, a fluorocarbon molecule, a short chain polymer of both types of molecules, or a branched hydrocarbon chain which may be attached to the nanowire surface via silane chemistry. Those of skill in the art will be familiar with numerous functionalizations and functionalization techniques which are optionally used herein (e.g., similar to those used in construction of separation columns, bio-assays, etc.). Alternatively, instead of binding ionomer to the nanowires through a chemical binding moiety, the nanowires may be directly functionalized to make them proton conductive. For example, the nanowires may be functionalized with a surface coating such as a perfluorinated sulfonated hydrocarbon using well-known functionalization chemistries.

For example, details regarding relevant moiety and other chemistries, as well as methods for construction/use of such, can be found, e.g., in Hermanson *Bioconjugate Techniques* Academic Press (1996), Kirk-Othmer *Concise Encyclopedia of Chemical Technology* (1999) Fourth Edition by Grayson et al. (ed.) John Wiley & Sons, Inc., New York and in Kirk-Othmer *Encyclopedia of Chemical Technology* Fourth Edition (1998 and 2000) by Grayson et al. (ed.) Wiley Interscience (print edition)/John Wiley & Sons, Inc. (e-format). Further relevant information can be found in *CRC Handbook of Chemistry and Physics* (2003) $83^{rd}$ edition by CRC Press. Details on conductive and other coatings, which can also be incorporated onto the nanowire surface by plasma methods and the like can be found in H. S. Nalwa (ed.), *Handbook of Organic Conductive Molecules and Polymers*, John Wiley & Sons 1997. See also, "ORGANIC SPECIES THAT FACILITATE CHARGE TRANSFER TO/FROM NANOCRYSTALS," U.S. Pat. No. 6,949,206. Details regarding organic chemistry, relevant for, e.g., coupling of additional moieties to a functionalized surface can be found, e.g., in Greene (1981) *Protective Groups in Organic Synthesis*, John Wiley and Sons, New York, as well as in Schmidt (1996) *Organic Chemistry* Mosby, St Louis, Mo., and March's *Advanced Organic Chemistry Reactions, Mechanisms and Structure*, Fifth Edition (2000) Smith and March, Wiley Interscience New York ISBN 0-471-58589-0, and U.S. Patent Publication No. 20050181195, published Aug. 18, 2005. Those of skill in the art will be familiar with many other related references and techniques amenable for functionalization of surfaces herein.

The polymer electrolyte coating may be directly linked to the surface of the nanowires, e.g., through silane groups, or may be coupled via linker binding groups or other appropriate chemical reactive groups to participate in linkage chemistries (derivitization) with linking agents such as, e.g., substituted silanes, diacetylenes, acrylates, acrylamides, vinyl, styryls, silicon oxide, boron oxide, phosphorus oxide, N-(3-aminopropyl)3-mercapto-benzamide, 3-aminopropyl-trimethoxysilane, 3-mercaptopropyl-trimethoxysilane, 3-maleimidopropyl-trimethoxysilane, 3-hydrazidopropyl-trimethoxysilane, trichloro-perfluoro octyl silane, hydroxysuccinimides, maleimides, haloacetyls, hydrazines, ethyldiethylamino propylcarbodiimide, and/or the like. Other surface functional chemistries can be used such as those that would be known to one or ordinary skill in the art.

In addition, a solubilized perfluorosulfonate ionomer (e.g., Nafion) may be placed into the spare space between nanowires. The composite nanowire structure (e.g., as a porous sheet of interconnected nanowires, e.g., made by the process described in the Example below), when not grown in situ on one of the bipolar plates and/or proton exchange membrane, may then be placed between bipolar plates on either side of a proton exchange membrane, and the assembly hot pressed to form a complete membrane-electrode assembly fuel cell according to the present invention. The pressing temperature is determined such that the proton exchange membrane is softened in that temperature range, for example, to 125 degrees Celsius for Nafion. The pressure level is about 200 $kgf/cm^2$. In order to efficiently distribute fuel/oxygen to the surface of the anode/cathode electrodes 308, 310, a gas diffusion layer is typically needed in conventional fuel cells between the anode electrode and bipolar plate on one side, and the cathode electrode and bipolar plate on the other side of the fuel cell. Typically, a carbon fiber cloth is used as the gas diffusion layer. With the interconnecting nanowire composite membrane electrode catalyst support assembly of the present invention, this gas diffusion layer can be eliminated due to the superior structure of the nanowire-based electrodes.

Example

The following non-limiting example describes an exemplary process for depositing gold (Au) nanoparticles on the surface of nanowires for use in a membrane electrode assembly according to the teachings of the present invention.

Figure 9:
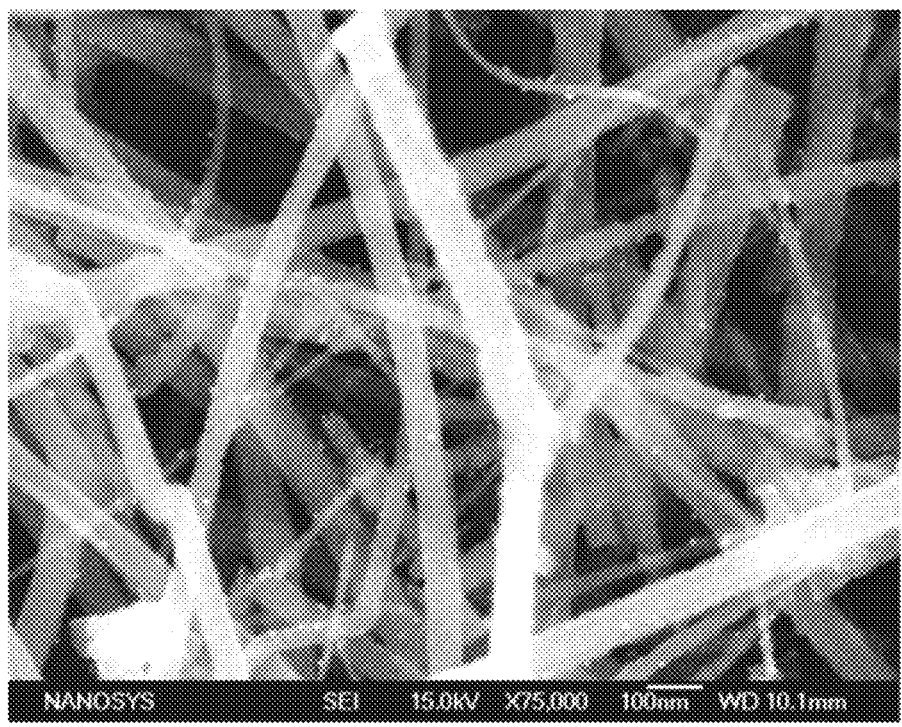
FIG. 9 is a SEM image showing Au catalyst particles deposited on a network of interconnected nanowires.

Approximately 10 mg Si nanowires were dispersed in ethanol by sonication to form a nanowire suspension. An interconnected nanowire network was prepared by vacuum filtration of the nanowire suspension over a polyvinylidene fluoride (PVDF) membrane and vacuum drying, then 2 cc 0.1% polylysine solution was added to the filter funnel to absorb polylysine on the surface of the nanowires. After 5 minutes, all liquid in the funnel was vacuum removed and the nanowire network was separated from the PVDF membrane. After being dried in an oven at 100 degrees Celsius for 15 minutes, the nanowire network was submerged in 10 cc of 10 nm Au colloid solution and soaked for 20 minutes to absorb the Au nanoparticles on the surface of the nanowires. Finally, the nanowire network was removed from the Au colloid solution, rinsed with isopropyl alcohol (IPA), and dried at 100 degrees Celsius to obtain a nanowire network coated with gold nanoparticles. FIG. 9 shows the SEM image of the Au catalyst nanoparticles deposited on the network of interconnected nanowires.

Although described in considerable detail above, it will be appreciated that various modifications may be made to the above-described invention, while still practicing the invention as it is delineated in the appended claims. All publications and patent documents cited herein are hereby incorporated herein by reference in their entirety for all purposes to the same extent as if each such document was individually incorporated herein.

What is claimed:

1. A composite comprising:
   a plurality of nanowires grown on and attached directly to a support structure comprising graphite, carbon or a carbon composite, the nanowires comprising crystalline silicon, polycrystalline silicon, amorphous silicon, or a mixture thereof; and
   a polymer electrolyte.
2. The composite of claim 1, wherein the nanowires are dispersed within the polymer electrolyte.
3. The composite of claim 1, wherein a portion of the polymer electrolyte is attached to the nanowires.
4. The composite of claim 1, wherein a portion of the polymer electrolyte is directly linked to the surface of the nanowires.
5. The composite of claim 1, wherein a portion of the polymer electrolyte forms a continuous or discontinuous polymer film coating on the surface of the nanowires.
6. The composite of claim 1, wherein a portion of the polymer electrolyte is uniformly wetted on the surface of the nanowires.
7. The composite of claim 1, wherein the nanowires comprise an interconnected network of nanowires.
8. The composite of claim 7, wherein the nanowires comprise at least one surface chemical group which forms chemical cross-links between the interconnected nanowires.
9. The composite of claim 1, wherein the polymer electrolyte comprises an ionomer, a polyethylene oxide, a poly(ethylene succinate), a poly(beta-propiolactone), or a sulfonated fluoropolymer.
10. The composite of claim 1, wherein the surfaces of the nanowires are functionalized.
11. The composite of claim 10, wherein the nanowires are functionalized with at least one functional group which promotes wetting of the polymer electrolyte on the nanowires.
12. The composite of claim 10, wherein the nanowires are functionalized with at least one functional group which binds the polymer electrolyte to the nanowires.
13. The composite of claim 10, wherein the nanowires are functionalized with at least one molecule selected from the group consisting of: a short chain polymer, a sulfonated hydrocarbon, a short chain sulfonated hydrocarbon, a fluorocarbon, a short chain fluorocarbon, and a branched hydrocarbon.
14. The composite of claim 10, wherein the nanowires are functionalized with at least one functional group selected from the group consisting of: a nitric acid group, a carboxylic acid group, a hydroxyl group, an amine group, a sulfonic acid group, or a silane group.
15. The composite of claim 1, wherein the composite is porous, wherein the porous composite comprise pores disposed between the nanowires of the plurality of nanowires.
16. The composite of claim 15, wherein the polymer electrolyte is disposed within the pores of the porous composite.
17. The composite of claim 1, wherein the nanowires comprise silicon or silicon carbide.
18. The composite of claim 1, wherein the nanowires comprise a core and one or more shell layers disposed on the core.
19. The composite of claim 1, further comprising one or more metal catalyst particles attached to the nanowires, wherein the metal catalyst particles comprise gold, copper, or mixtures or alloys thereof.
20. The composite of claim 1, wherein the composite is electrically conductive.
21. An electrode comprising the composite of claim 1.
22. An anode comprising the composite of claim 1.

* * * * *